United States Patent
Loonis et al.

[11] 3,904,299
[45] Sept. 9, 1975

[54] DEVICE INTENDED TO PROTECT A JOINT BETWEEN TWO ELEMENTS

[75] Inventors: Bernard M. Loonis, Nanteuil-la-Haudouin; Richard Goddard, Senlis, both of France

[73] Assignee: Societe Anonyme: Poclain, Belleville, France

[22] Filed: Aug. 9, 1974

[21] Appl. No.: 496,277

[30] Foreign Application Priority Data
Aug. 9, 1973   France .............................. 73.29222

[52] U.S. Cl. ................... 403/157; 403/288; 277/80
[51] Int. Cl. ........................................... F16c 11/00
[58] Field of Search .......... 403/157, 158, 161, 162, 403/163, 288, 79, DIG. 1; 277/80

[56] References Cited
UNITED STATES PATENTS

| | | | |
|---|---|---|---|
| 2,557,140 | 6/1951 | Razdowitz | 277/80 |
| 2,632,656 | 3/1953 | Balcom | 403/79 X |
| 2,967,726 | 1/1961 | Weston | 403/157 |
| 3,554,587 | 1/1971 | Baker et al. | 403/157 |

*Primary Examiner*—Andrew V. Kundrat
*Attorney, Agent, or Firm*—Fitzpatrick, Cella, Harper & Scinto

[57] ABSTRACT

A joint assembly comprises two side plates interposed between two flanges of a stationary element carrying a bearing spindle, and a movable element pivotal about the spindle. The side plates have a magnetic surface facing the flanges of the stationary element and a non-magnetic surface facing the movable element and carrying seals.

5 Claims, 2 Drawing Figures

DEVICE INTENDED TO PROTECT A JOINT BETWEEN TWO ELEMENTS

BACKGROUND OF THE INVENTION

1. Field of the Invention

The present invention relates to joint assemblies.

2. Description of the Prior Art

Joint assemblies have been proposed in the form of two elements pivotally connected by means of a bearing spindle, an axial clearance being provided for operation and assembly and permitting displacement along the bearing spindle of one element with respect to the other. It is necessary to seal the joint assembly whilst retaining this axial clearance, in order to prevent penetration of foreign bodies into the clearance. For this purpose, it has been proposed to arrange lipped or other toroidal seals; such an arrangement is, however, disadvantageous due to the risk of squashing the seals during axial displacements and due to the precise machining required to fit them in position. It has also been proposed to use side plates carrying the seals, the plates being movable with respect to the elements, in such manner as to permit the axial clearance to be taken up by means of elastic members, strips, or hydraulic pressure; such an arrangement is, however, relatively complex.

SUMMARY OF THE INVENTION

According to the present invention, there is provided an assembly comprising a spindle, a first element mounted on the spindle and having a cylindrical surface, a second element, said second element having two flanges, the first element lying between the flanges and the flanges acting as steps to limit relative axial displacement between the first and second elements, two plates, each disposed with a clearance between the first element and a respective one of the flanges of the second element, each said plate having a first surface facing towards the adjacent flange and a second, opposing, surface, the first surface being magnetic and the second surface including a cylindrical bearing portion substantially co-axial with the spindle, and sealing means, said cylindrical bearing portion co-operating with said cylindrical surface via said sealing means.

In one preferred embodiment of the invention, each side plate comprises a magnetic ring having opposed axial surfaces; one axial surface of the ring forms the aforesaid magnetic surface, the ring being inset in, and secured by its other axial surface to one surface of a plate-like non-magnetic support member which comprises the aforesaid bearing surface.

In one preferred embodiment of the invention, each side plate comprises a magnetic ring having opposed axial surfaces; one axial surface of the ring forms the aforesaid magnetic surface, the ring being inset in, and secured by its other axial surface to one surface of a plate-like non-magnetic support member which comprises the aforesaid bearing surface.

In a second preferred embodiment, each side plate comprises a magnetic ring embedded in a non-magnetic plate-like support member adjacent to the surface thereof facing the flange.

Preferably, the other surface of the support member advantageously has an annular projection providing two cylindrical bearing portions co-axial with the bearing spindle and co-operating with the cylindrical surface of an annular groove correspondingly formed in the first element, by means of two toroidal seals carried by the projection.

A respective shoulder carried by the first element adjacent to the spindle can be interposed between the side plates and the spindle.

BRIEF DESCRIPTION OF THE DRAWINGS

Embodiments of the invention will now be described, by way of example only, with reference to the accompanying diagrammatic drawings, in which.

DESCRIPTION OF THE PREFERRED EMBODIMENTS

Figure 1:
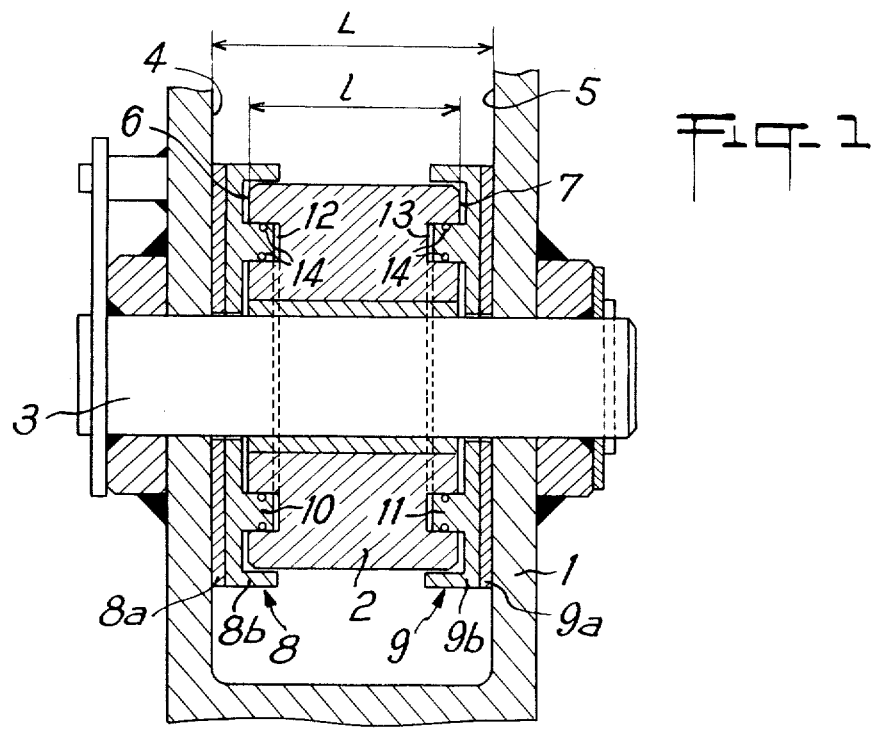
FIG. 1 is a cross-section of one form of joint assembly in accordance with the present invention.

The joint assembly shown in FIG. 1, comprises two elements 1 and 2, pivotally coupled for rotation about the axis of a spindle 3 rigid with the element 1. The element 1 comprises flanges 4 and 5 spaced by a distance L and lying opposite side surfaces 6 and 7 of the element 2, the surfaces 6 and 7 being spaced by a distance 1. The difference between the distances L - 1 determines an axial clearance of the joint. Two side plates 8 and 9 are situated respectively, between the flange 4 and the surface 6, and between the flange 5 and the surface 7. Each of the plates 8 and 9 comprises a magnetic element 8a, 9a and a non-magnetic element 8b, 9b. The magnetic elements 8a, 9a form magnetic surfaces facing towards the element 1, and the non-magnetic elements 8b, 9b form nonmagnetic surfaces facing towards the element 2. In the arrangement shown in FIG. 1, the plates 8 and 9 are held against the flanges 4 and 5 by magnetic attraction. Each of the non-magnetic elements 8b and 9b of the plates 8 and 9 has an annular projection 10 and 11 respectively engaged in a corresponding groove 12 and 13 formed in the element 2. The projections 10 and 11, and the grooves 12 and 13 are substantially co-axial with respect to the spindle 3, and the inner and outer peripheral surfaces of the projections and of the grooves are of cylindrical form. Each projection has two toroidal seals 14 which are held in contact with the axial sides of each of the grooves. The sum of the thicknesses of the components of each side plate is smaller than the distance L - 1 to provide an axial clearance for the element 2 which is required for its satisfactory operation.

Figure 2:
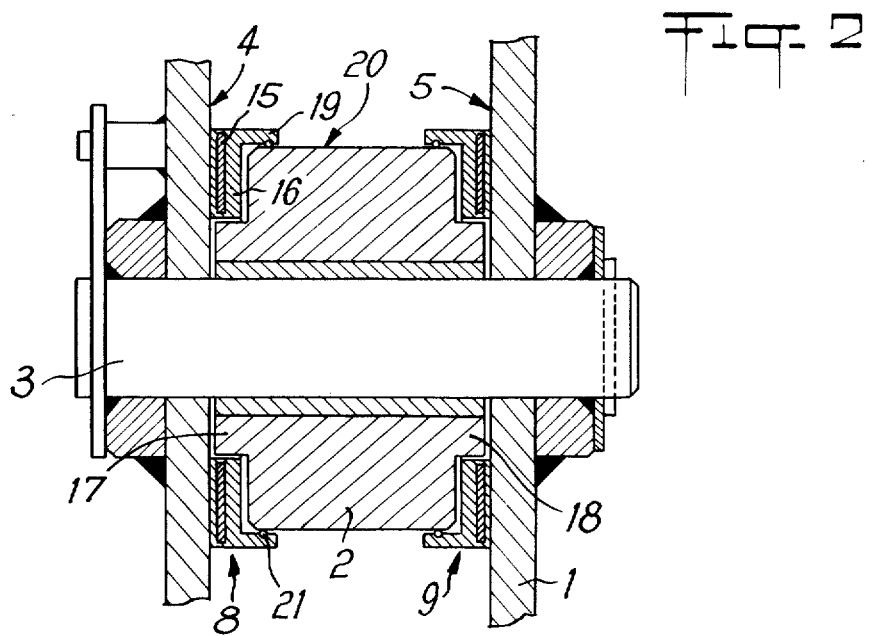
FIG. 2 is a cross-section of another form of joint assembly.

In the embodiment shown in FIG. 2, each side plate 8, 9 comprises a magnetic ring 15 embedded in support member 16 of non-magnetic material and situated adjacent the surface of the plate facing towards the corresponding flange 4 or 5. The plates 9 and 10 are located around annular shoulders 17 and 18 extending axially from the element 2, and each plate has an axially inwardly directed annular extension 19 surrounding the element 2 and co-operating with a cylindrical external surface 20 of the latter by means of a toroidal seal 21.

In the embodiments described, the friction surfaces of the element 2 on the spindle 2 are protected against the action of foreign bodies. Foreign bodies cannot obtain access to the surfaces through the axial clearance space, since the magnetic side plates provide a seal between the elements 1 and 2 by magnetic contact of one of their surfaces against one of the flanges 4 or 5 of the element 1 on the one hand, and by the interposition of at least one packing seal between the plates and the element 2. The inner space of the assembly thus formed is accordingly isolated from the external environment. This isolation is established whilst permitting the axial displacement required for the element 2 with respect to the element 1, this displacement not resulting in compression of the side plates, at least in the embodiment of FIG. 2.

The arrangements particularly described are especially advantageous due to producing, storing and assembling the side plates. It is unnecessary to machine the workpieces forming the side plates with great precision, in particular in respect of centering the different cylindrical surfaces formed in same. It will be apparent, for example, that the axis of the projection 10 or 11 need not coincide exactly with the axis of the spindle 3, lateral displacement of the magnetic contact area between the side plates and the element 1 not being deleterious. It is easy to store the side plates moreover, before assembling the joint. It is sufficient to position each side plate at its location at either side of the element 2. The magnetic attraction will operate between the element and the magnetic elements 8a and 9a through the non-magnetic elements 8b and 9b and will enable retention of the side plates on the elements 2 throughout the storage period. At the time of assembling the joints, the side plates will be thrust against the flanges 4 and 5 of the element 1 since the magnetic attraction between the element 1 and the side plates will be more powerful than between these latter and the element 2 since it is attentuated in this direction by the presence of the non-magnetic material. Similarly, dismantling of the assembly is greatly eased.

The frictional contact surfaces are protected effectively due to the labyrinth or baffle arrangement thus formed in conjunction with packing seals between the side plates and the element 2. The seals have a relatively long working life since, although there is axial displacement of the elements with respect to each other, such displacement does not cause axial compression of the seals and thus premature deterioration.

The joint assemblies described are of particular use in construction of machinery.

What is claimed is:

1. An assembly comprising
    a spindle,
    a first element mounted on the spindle and having a cylindrical surface,
    a second element, said second element having two flanges, the first element lying between the flanges and the flanges acting as stops to limit relative axial displacement between the first and second elements,
    two plates, each disposed with a clearance between the first element and a respective one of the flanges of the second element, each said plate having a first surface facing towards the adjacent flange and a second, opposing, surface, the first surface being magnetic, and the second surface including a cylindrical bearing portion substantially co-axial with the spindle, and
    sealing means, said cylindrical bearing portion co-operating with said cylindrical surface via said sealing means.

2. An assembly according to claim 1, wherein each said plate comprises
    a ring of magnetic material having first and second opposed axial surfaces, and
    a support member of non-magnetic material, said support member including said cylindrical bearing portion, the said first axial surface of the ring forming the said first surface of the plate, and the said second surface of the ring being secured to the support member.

3. An assembly according to claim 1, wherein each said plate comprises
    a ring of magnetic material, and
    a support member of non-magnetic material, said support member providing said first and second surfaces of the plate, the ring being embedded in the support member adjacent to the first surface.

4. An assembly according to claim 2, wherein the support member has an annular projection, the peripheral surfaces of which define two cylindrical bearing portions substantially co-axial with the spindle, the first element has an annular groove the peripheral surfaces of which define two cylindrical surfaces, and said sealing means comprises
    toroidal seals, said projection being located in said groove and said seals being located between the adjacent peripheral surfaces of the projection and the groove.

5. An assembly according to claim 1, wherein the first element includes
    two shoulders, said shoulders lying adjacent the spindle, and each said shoulder being interposed between the spindle and a respective said plate.

* * * * *

UNITED STATES PATENT OFFICE
CERTIFICATE OF CORRECTION

Patent No. 3,904,299          Dated September 9, 1975

Inventor(s) BERNARD M. LOONIS and RICHARD GODDARD

It is certified that error appears in the above-identified patent and that said Letters Patent are hereby corrected as shown below:

Column 1, lines 52 to 58, delete "In one preferred embodiment" to and including "aforesaid bearing surface."
    Column 2, line 60, change "spindle 2" to -- spindle 3 --.

Signed and Sealed this third Day of February 1976

[SEAL]

Attest:

RUTH C. MASON
*Attesting Officer*

C. MARSHALL DANN
*Commissioner of Patents and Trademarks*